United States Patent [19]

Schroeder

[11] Patent Number: 4,560,562

[45] Date of Patent: Dec. 24, 1985

[54] MARSHMALLOW SHEET AND PACKAGING ARRANGEMENT

[76] Inventor: John E. Schroeder, P.O. Box 2684 Gravois Station, St. Louis, Mo. 63116

[21] Appl. No.: 669,013

[22] Filed: Nov. 7, 1984

[51] Int. Cl.$^4$ ............................ A23G 3/00; A23P 1/08; B65D 81/00; B65D 85/00

[52] U.S. Cl. ...................................... 426/87; 426/104; 426/106; 426/112; 426/383; 426/414; 426/94; 426/103; 206/484; 206/459; 206/525; 434/88; 428/7; D1/108

[58] Field of Search ............... 426/87, 414, 104, 383, 426/112, 128, 503, 106; 434/87, 88, 127; 206/575, 459, 484, 578, 579, 224

[56] References Cited

U.S. PATENT DOCUMENTS

| | | | |
|---|---|---|---|
| 1,421,975 | 7/1922 | Meyers | 434/88 |
| 1,592,750 | 7/1926 | Spektor | 434/87 |
| 1,788,493 | 1/1931 | Olschewsky | 426/383 |
| 2,610,588 | 9/1952 | Seagren et al. | 426/104 |
| 2,813,033 | 11/1957 | Schneider | 426/413 |
| 3,154,461 | 10/1964 | Johnson | 264/210.1 |
| 3,410,699 | 11/1968 | Peters | 426/132 |
| 3,503,345 | 3/1970 | Abrams | 426/517 |
| 3,861,066 | 1/1975 | Klaja | 434/87 |
| 4,397,871 | 8/1983 | Meyer et al. | 426/383 |

FOREIGN PATENT DOCUMENTS 422430 1/1935 United Kingdom ............... 426/383

OTHER PUBLICATIONS

Modern Packaging Encyclopedia, 7/71, vol. 44, #7A, p. 175.
Good Housekeeping Complete Book of Cake Decorating, Hearst Corp., 1973, pp. 52,69,71,133,150,151,162,163,164.
Washington Post, 10/5/75, Comics Section.
Halloween Cutouts, 9/10 1969, pp. 134,135.

Primary Examiner—Steven Weinstein
Attorney, Agent, or Firm—Palmatier, Sturm, Sjoquist & Baker

[57] ABSTRACT

A combination of a thin sheet of marshmallow, or the like, that is enclosed and sealed in plastic-like film. The film may be suitably frosted to allow creative markings thereon to serve as patterns on the marshmallow sheet for making cutouts from the sheet. Such cutouts may be used in decorating a food stuff, creating edible crafts, substituting for heavy sugar substances and creating other confectionary ideas.

9 Claims, 9 Drawing Figures

MARSHMALLOW SHEET AND PACKAGING ARRANGEMENT

BACKGROUND OF THE INVENTION

The present invention relates to a combination of a food product of the expanded confectionary type, a packaging arrangement therefor and uses thereof. More particularly, the invention relates to a combination of a thin sheet of marshmallow, or the like, that is sandwiched and sealed between two films of plastic.

Marshmallow is well known for its delectable quality while having less calories than other more sugary substances. Marshmallow is also unique in that it has a sponge-like resiliency and a meltable characteristic when moderately heated. As taught in U.S. Pat. No. 3,018,183, issued to Downey, on Jan. 23, 1962, a marshmallow mix essentially consists of: water, sugar such as dextrose, gelatin, cornstarch, moisture retaining agent such as sorbitol and flavoring such as vanilla. The mixture is then whipped to a light creamy consistency, poured into a desired mold and then permitted to stand and set for a short while to form a pliable skin on its outer surface.

Marshmallow is available in a limited number of forms. Marshmallow creme or tubular sections formed into drops of various sizes are presently available. U.S. Pat. No. 4,104,405, issued to Forkner, on Aug. 1, 1978, teaches of the combination of marshmallow bonded to the outer peripheral surface of the head of an ice cream cone. U.S. Pat. No. 4,415,595, issued to Takemori et al., on Nov. 15, 1983, discloses a frozen marshmallow confection in which marshmallow completely encloses a core of ice cream or sherbet.

In the past, molded confectionary icings and decorations have had a high caloric, heavy sugar content. U.S. Pat. No. 615,191, issued to Lembke, on Nov. 29, 1898, teaches a process of making such confectionary ornaments by pouring a rapidly settleable liquid sugar substance into a mold on a base sheet of edible plastic material and then cutting the molded figure out of the base sheet. U.S. Pat. No. 1,129,406 also discloses an edible, sugary plastic cake top decoration and method of making such.

SUMMARY OF THE INVENTION

The present invention provides for a thin sheet of marshmallow-like material sealed between two plastic films. This novel combination provides for a marshmallow sheet that may be used in decorating food stuffs, creating edible and ornamental crafts and designs, substituting for sugary frostings or toppings and concocting other confectionary ideas.

My invention provides a combination of a thin sheet of marshmallow, or the like, that is sandwiched and sealed between two films of plastic. The first film of plastic is preferably transparent. The second film of plastic is suitably frosted or slightly roughened. The two films are fused together at their corresponding edges, such as by heat, to seal the marshmallow sheet between the films.

Marshmallow in a thin sheet lends itself to many new creative expressions. Practical culinary arts, ornamental decorations and crafts may be cut out of the marshmallow sheet—limited only by the individual users imagination.

The first film of plastic is transparent to allow inspection of the packaged marshmallow sheet. The second film of plastic is frosted to allow creative tracings or markings thereon for prospective cutouts to be made out of the marshmallow sheet. Such markings serve as stencils or patterns for cutting and removing with a razor tipped knife or scissors the desired shapes from the marshmallow sheet. The respective edges of the films are fused to impermeably seal the marshmallow sheet within the film provided for an air tight and moisture proof enclosure to keep the marshmallow sheet fresh.

DESCRIPTION OF THE PREFERRED EMBODIMENT

Figures 1, 9:
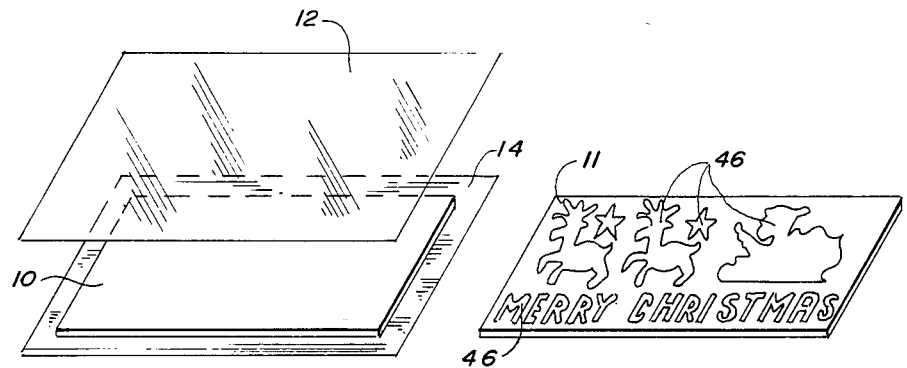
FIG. 1 is an perspective view of a thin marshmallow sheet between two plastic films.
FIG. 9 is a perspective view of a modified marshmallow sheet with thematic die-cut designs and letters.
Figures 2, 3:
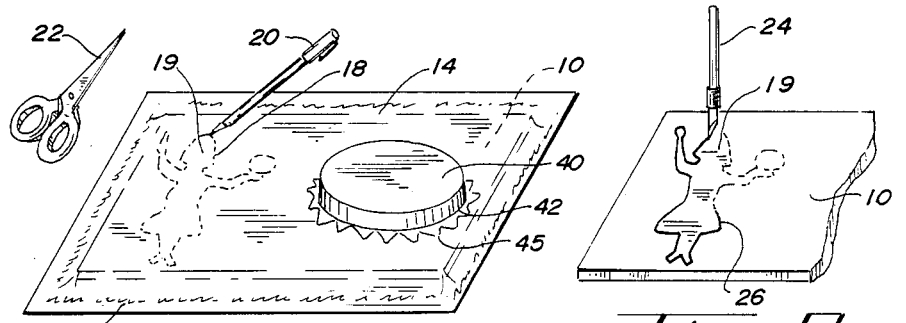
FIG. 2 is a perspective view of the marshmallow sheet sealed between two plastic films, the top film being frosted with markings thereon.
FIG. 3 is a perspective view of the marshmallow sheet partially cut away with a knife tracing a pattern on the marshmallow sheet.

Referring to FIGS. 1 and 2, an expanded confection of marshmallow-like material is formed into a thin sheet 10 approximately ⅛ inch thick, 10 inches wide and 10 inches long. The dimensions of the marshmallow sheet 10 may vary greatly and also be of a round configuration.

The marshmallow sheet 10 is sandwiched between two films of FDA-approved plastic, cellophane or like 12 and 14. Film 12 is transparent while film 14 is frosted or slightly roughened. The length and width of the films 12 and 14 are dependent upon the marshmallow sheet's 10 dimensions. That is, films 12 and 14 must completely overlap sheet 10. Films 12 and 14 are then fused or bonded together at their corresponding edges 16, suitably by heat. The marshmallow sheet 10 is thereby completely enclosed within sealed films 12 and 14 to keep the marshmallow fresh, retain its moisture and resilient sponge-like character, and generally protect the marshmallow sheet 10 from the atmosphere and other contaminates.

Film 12 is preferably transparent to permit visual inspection of marshmallow sheet 10. Film 14 is preferably frosted, or slightly roughened, to accept tracings or markings 18 by a marker 20 as shown in FIG. 2.

Figures 4, 6, 7:
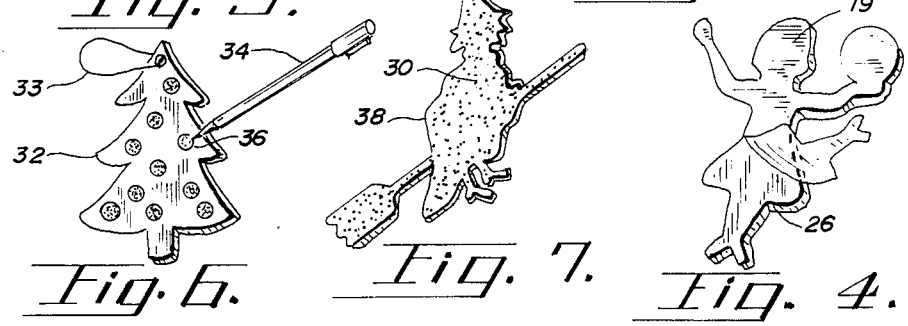
FIG. 4 is a perspective view of a cutout with its pattern partially peeled off.
FIG. 6 is an elevational view of an ornamental cutout from the marshmallow sheet.
FIG. 7 is an elevational view of a sculpture cutout from the marshmallow sheet.

Once film 14 has been traced or marked 18 to form a stencil or pattern 19, a razor tipped knife 24, such as an X-Acto knife, may be used to forcefully trace marks 18 of pattern 19 to thereby form cutout 26. Film 14 holds marshmallow sheet 10 while it is being cut to help minimize shape distortion of cutout 26 caused by marshmallow sheet 10 sticking to knife 24. Cutout 26 and pattern 19 are then lifted from sheet 10 and pattern 19 is peeled off cutout 26, as shown in FIG. 4.

Alternatively, after markings 18 have been made on film 14, sealed edge 16 of films 12 and 14 may be cut open by a scissors 22 and marshmallow sheet 10 removed. The tracings or markings 18 may then be cut out of film 14 by scissors 22 to form a stencil or pattern 19. As shown in FIG. 3, pattern 19 is placed on marshmallow sheet 10 and then cutout 26 may be removed from sheet 10 by scissors 22 following pattern 19 with minimal distortion or traced and cutout by razor tipped knife 24.

Figures 5, 8:
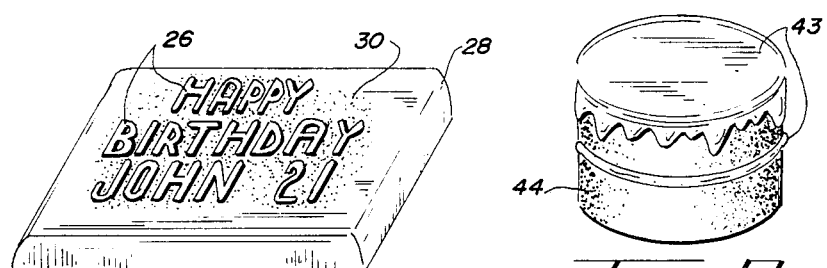
FIG. 5 is a perspective view of a cake decorated with cutouts from the marshmallow sheet.
FIG. 8 is a perspective view of a two-tier cake with marshmallow frosting.

As shown in FIG. 5, cutouts 26, which may be any thematic design, logo, letter or numeral, may to be used in decorating a cake 28. Colored sugar 30 may be sprinkled on cake 28 before cutouts 26 are placed thereon to add a silhouetting decorative contrast. Contrarily, egg white may be brushed onto cutouts 26 and colored sugar 30 then sprinkled on cutouts 26. Consequently both positive and negative silhouette decorations may be made.

In a fluffier texture of cutouts 26 with secured adhesion to the cake 28 is desired, cake 28 with cutouts 26 may be placed in a moderately heated conventional oven (or microwave oven) for a few minutes to melt cutouts 26 onto cake 28.

Referring to FIG. 6, ornaments, such as tree ornament 32, may be cut out of the fresh marshmallow sheet 10 and allowed to air dry and harden. Ornament 32 may be hung from a tree by a thread loop 33. Before the marshmallow-like material is formed into thin sheet 10, FDA-approved food coloring may be mixed therewith to accent marshmallow sheet 10 in light pastel tones. Additionally, fiber-tipped pens 34, with FDA-approved food coloring, may be used to draw directly onto ornament 32 adding still further creative designs such as Christmas tree bulbs 36. FIG. 7 shows a witch sculpture 38 with colored sugar 30 added thereon for a contrasting decorative effect. Other craft items, such as mobiles, may be created from various cutouts 26 in this manner.

As shown in FIGS. 2 and 8, people who wish to reduce their sugar intake may take a cake pan 40 and trace a marshmallow frosting substitute pattern 42 on frosted film 14 and cut out a marshmallow frosting 43 from sheet 10. The marshmallow frosting 43 may be used between the tiers and on the top of a two-tier cake 44. Moderate heating will create a melted adherence of marshmallow frosting 42 to cake 44. An icicle effect with marshmallow frosting 42 may be created by making serrated edges 45 on pattern 42.

In addition to decorating cakes, cookies, pies and the like, the remaining scraps of marshmallow sheet 10 may be used in hot drink enhancements or mixed in with batters, fruits or vegtables to be baked and thereby add flavor to the final product.

A modified marshmallow sheet 11 is shown in FIG. 9. Before marshmallow sheet 11 is sealed between films 12 and 14, sheet 11 is die-cut or scored with consistant thematic designs, symbols, letters or numerals 46. Such die-cuts 46 simply pop out of sheet 11 and are ready for their intended uses. This arrangement may be desirable for individuals who are less artistically inclined, of a young age or operating under time constraints and wish to have the designs ready made. Possible themes for sheet 11 may be: Christmas with Nativity and Santa Claus characters; Easter with Biblical figures, rabbits, eggs and "Happy Easter"; birthdays with "Happy Birthday", numbers and letters; Thanksgiving with turkeys; and Halloween with ghosts and witches.

In another modified form, films 12 and 14 may be of a single piece of plastic folded substantially in half about marshmallow sheet 10 and fused or otherwise bonded together at its corresponding edges on three sides of marshmallow sheet 10. The piece of plastic film may be printed with suitable designs or partially frosted to receive tracings.

The illustrated embodiments should be considered in all respects as illustrative and not restrictive, reference being made to the appended claims rather than to the foregoing specification to indicate the scope of the invention.

That which is claimed is:

1. A combination of a thin sheet of expanded confectionary marshmallow food product, enclosed and sealed in first and second pieces of plastic film joined together at their corresponding edges, the first piece of film being transparent to allow visual inspection, of the enclosed marshmallow sheet, the second piece of film being frosted sufficient to allow creative tracings and markings to be made thereon by a marker for prospective cutouts to be made out of the marshmallow sheet.

2. The combination of claim 1, wherein said sheet is die-cut with consistent thematic designs and symbols.

3. The combination of claim 1, wherein said sheet is die-cut with numerals and letters.

4. A combination of a thin sheet of expanded confectionary marshmallow food product, between first and second plastic films, said first and second films are fused together at their corresponding edges thereby enclosing and sealing the sheet therebetween, said first film being transparent to allow visual inspection of the enclosed marshmallow sheet and said second film being frosted sufficient to allow creative tracings and markings to be made thereon by a marker for prospective cutouts to be made out of the marshmallow sheet.

5. The combination of claim 4, wherein said sheet is die-cut with consistent thematic designs and symbols.

6. The combination of claim 4, wherein said sheet is die-cut with numerals and letters.

7. A package of confectionary food product for decorating food stuffs, creating edible and ornamental crafts and designs, substituting for sugary frostings and concocting other confectionary ideas, comprising
   (a) a thin sheet of expanded confectionary marshmallow food product; and
   (b) a plastic film enclosure for preserving and sealing the marshmallow sheet sealed therein in a sandwich arrangement, the enclosure having a top transparent film to allow visual inspection of the enclosed marshmallow sheet and a bottom frosted film sufficient to allow creative tracings and markings to be made thereon by a marker for prospective cutouts to be made out of the marshmallow sheet.

8. The package of claim 7 wherein the thin marshmallow sheet is approximately ⅛ inch thick.

9. The package of claim 7 wherein the marshmallow sheet is die-cut with consistent thematic designs and symbols.

* * * * *